(12) United States Patent
Novosel et al.

(10) Patent No.: US 9,707,500 B2
(45) Date of Patent: Jul. 18, 2017

(54) MATERIAL SEPARATOR

(71) Applicant: ESTA Apparatebau GmbH & Co. KG, Senden (DE)

(72) Inventors: Michael Novosel, Heidenheim (DE); Bernhard Frank, Weissenhorn (DE); Lisa Görmiller, Bellenberg (DE)

(73) Assignee: ESTA Apparatebau GmbH & Co. KG, Senden (DE)

( * ) Notice: Subject to any disclaimer, the term of this patent is extended or adjusted under 35 U.S.C. 154(b) by 147 days.

(21) Appl. No.: 14/832,457

(22) Filed: Aug. 21, 2015

(65) Prior Publication Data

US 2016/0367923 A1 Dec. 22, 2016

(30) Foreign Application Priority Data

Jun. 22, 2015 (DE) .................. 10 2015 110 000

(51) Int. Cl.
| | | |
|---|---|---|
| *B01D 41/00* | (2006.01) | |
| *B01D 45/08* | (2006.01) | |
| *B01D 50/00* | (2006.01) | |
| *B01D 46/00* | (2006.01) | |
| *B01D 45/16* | (2006.01) | |
| *B01D 45/06* | (2006.01) | |
| *B01D 45/12* | (2006.01) | |
| *B01D 46/24* | (2006.01) | |

(52) U.S. Cl.
CPC ............ *B01D 45/08* (2013.01); *B01D 45/06* (2013.01); *B01D 45/12* (2013.01); *B01D 45/16* (2013.01); *B01D 46/0027* (2013.01); *B01D 46/0045* (2013.01); *B01D 50/002* (2013.01); *B01D 46/2411* (2013.01)

(58) Field of Classification Search
CPC .............. B01D 50/002; B01D 46/2411; B01D 46/0045; B01D 45/08; B01D 46/0027; B01D 45/16; B01D 45/06; B01D 45/12
See application file for complete search history.

(56) References Cited

U.S. PATENT DOCUMENTS

| | | | | |
|---|---|---|---|---|
| 4,999,037 A | * | 3/1991 | Albritton ............... | B01D 45/08 55/385.1 |
| 5,979,507 A | * | 11/1999 | Kojima .................. | B01D 45/08 138/39 |
| 2012/0060820 A1 | * | 3/2012 | Sikkenga ............... | B01D 45/08 126/1 R |

FOREIGN PATENT DOCUMENTS

| | | |
|---|---|---|
| CN | 201 684 485 U | 12/2010 |
| DE | 25 33 827 A1 | 2/1977 |
| EP | 2 363 190 A1 | 9/2011 |
| FR | 2 778 580 A1 | 11/1999 |
| JP | H03-146 108 A | 6/1991 |

* cited by examiner

*Primary Examiner* — Dung H Bui
(74) *Attorney, Agent, or Firm* — Renner, Otto, Boisselle & Sklar, LLP

(57) ABSTRACT

A material pre-separator with an intake side and an outlet side for a particle-contaminated air flow and with several strip-shaped separating elements that are arranged vertically on top of one another, wherein the separating elements are initially arranged from the top toward the bottom with an increasing positive angle relative to the vertical line and at least one lower separating element has a negative angle relative to the vertical line.

5 Claims, 4 Drawing Sheets

MATERIAL SEPARATOR

This application claims priority of German Application No. 10 2015 110 000.2 filed Jun. 22, 2015, which is hereby incorporated herein by reference.

The invention pertains to a material pre-separator with an intake side and an outlet side for a particle-contaminated air flow.

The function of air extraction and filtration systems for industrial applications such as, for example, factory buildings is frequently impaired by a particle-contaminated air flow. For example, a high particle content leads to premature clogging of the filters used in such extraction systems. Another problem, in particular, with air that is contaminated with welding fumes can be seen in that it still contains hot or glowing particles and particulates that can cause burning of the filter or parts of the system exposed to the air flow such as hoses or the like.

In extraction systems with the most space-saving constructive design possible, it would be desirable to realize a more effective and selective separation of particles by means of a material pre-separator.

The invention therefore is based on the objective of making available a particle filter for extraction systems that has a simple and compact construction and allows the most effective selection of particles possible.

The invention accordingly proposes a material pre-separator with an intake side and an outlet side for a particle-contaminated air flow and with several strip-shaped separating elements that are arranged vertically on top of one another, wherein said material pre-separator is characterized in that the separating elements are initially arranged from the top toward the bottom with an increasing positive angle relative to the vertical line and at least one lower separating element has a negative angle relative to the vertical line. In this way, highly selective sorting of particles can be achieved in a particularly effective fashion.

The air volume flow is purposefully deflected due to the arrangement of the separating elements. A separation of the fractions (air and particles contained therein) is achieved in this way. The air flow is cleaned as a result thereof.

It is preferred that at least one of the separating elements features on its lower edge a lower channel that opens toward the outlet side. It is accordingly also preferred that at least one of the separating elements features on its upper edge an upper channel that opens toward the intake side.

The respective angles of inclination of the separating elements (2, 3 and 4) relative to the vertical line are advantageously chosen between 21° and 31° and between 31° and 41°, as well as between −7° and −13°.

According to a preferred embodiment of the invention, it is proposed that the separating elements are arranged behind and underneath one another with an overlap viewed from the intake side.

According to a variation of the invention, it is proposed that two separating elements with the same angle of inclination relative to the vertical line are arranged on top of one another.

On the intake side, the air flow preferably acts upon the material pre-separator from the front and/or from above.

The separating elements are advantageously formed by metal sheets.

According to a particularly advantageous embodiment of the invention, it is proposed that the opening width of the lower edge of the separating elements relative to a common vertical line decreases from separating element to separating element in the downward direction and once again widens on the bottom separating element.

Additional advantageous embodiments result from the other dependent claims or their potential subcombinations.

The invention is described in greater detail below with reference to the drawings. In these individual schematic drawings.

In these figures, identical or identically acting elements are identified by the same reference symbols.

Figure 1:
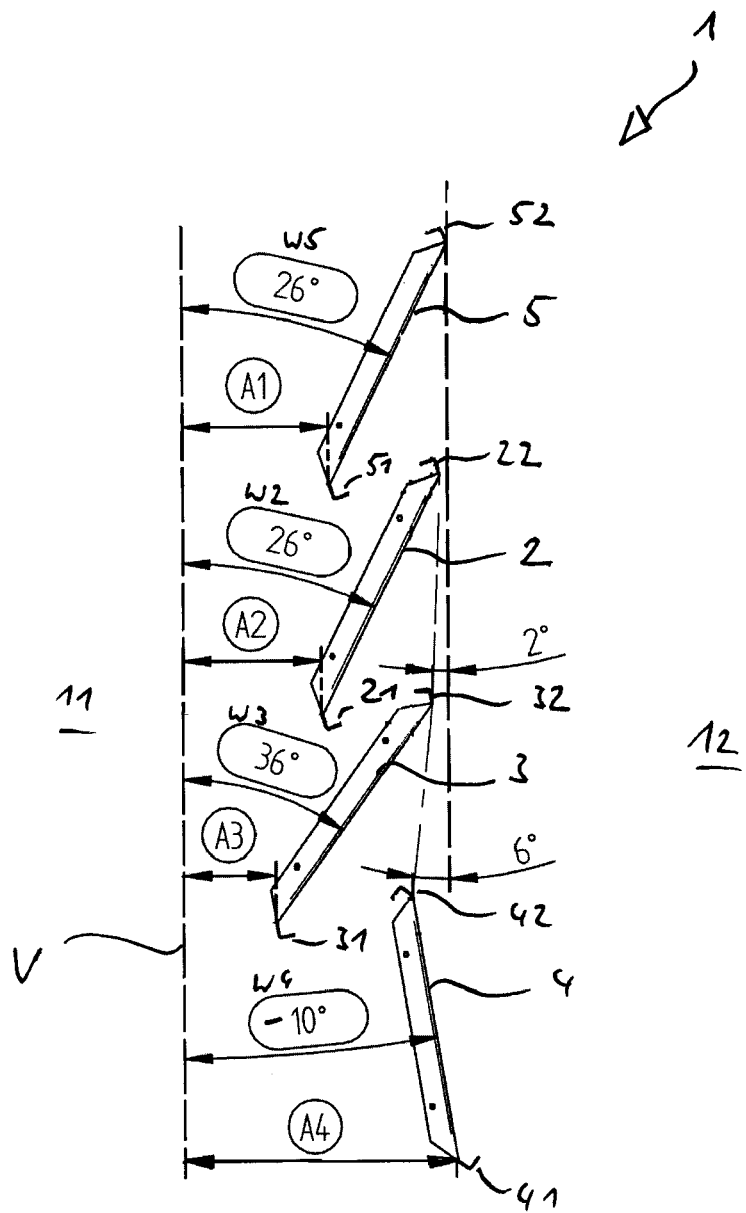
FIG. 1 shows a schematic side view of an inventive material pre-separator.

FIG. 1 shows a side view of a material pre-separator 1 for a particle-contaminated air flow that can pass through the material pre-separator 1 from an intake side 11 to an outlet side 12.

Figure 2:
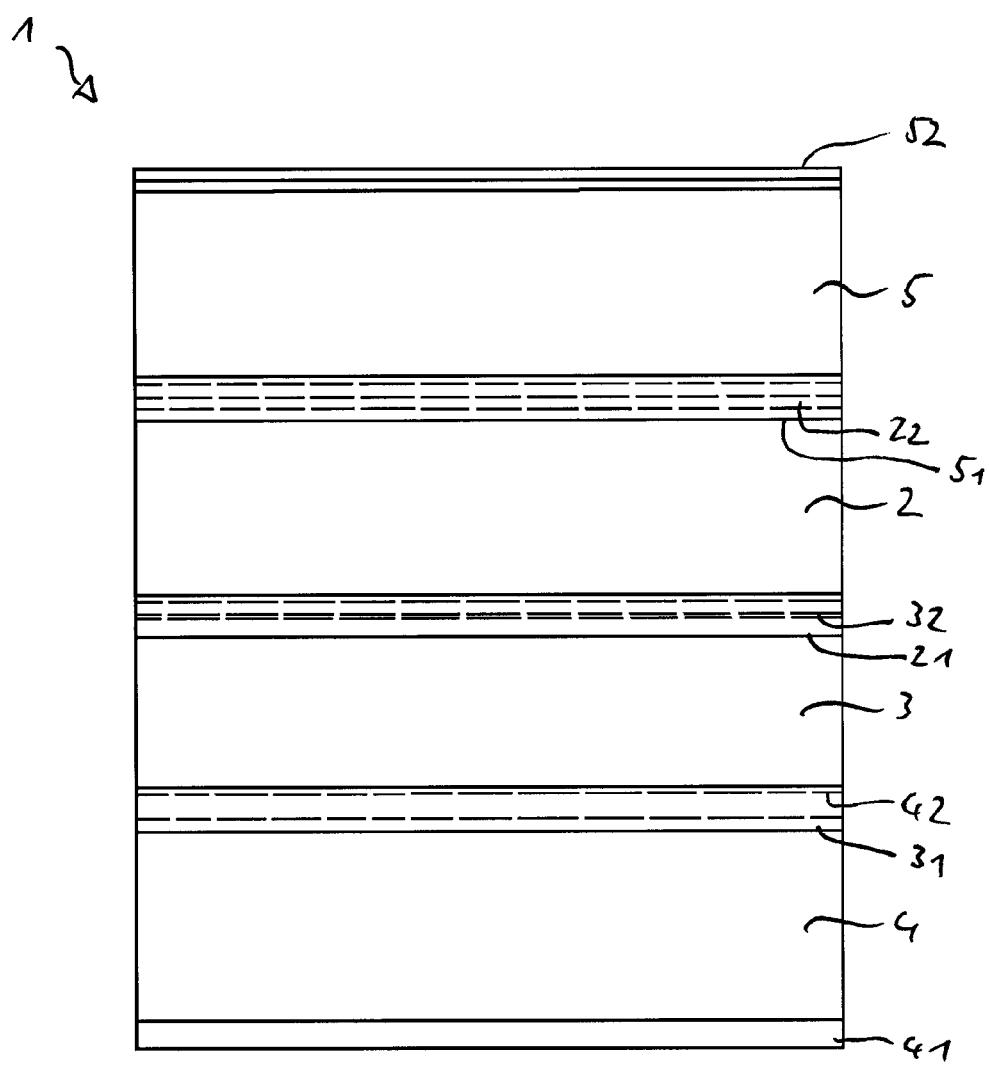
FIG. 2 shows the material pre-separator according to FIG. 1 in the form of a front view of the intake side.

In this case, separating elements 5, 2, 3, 4—which are formed by metal sheets in the example shown—are arranged vertically on top of one another. The separating elements 5, 2, 3, 4 are realized in the form of strips and arranged behind and underneath one another with an overlap viewed from the intake side 11 (in this respect, see also FIG. 2).

The separating elements 2, 3 and 4 form the central group of the material pre-separator. The separating elements 2, 3 are initially arranged from the top toward the bottom with an increasing positive angle W2, W3 relative to the vertical line V and a lower separating element 4 has a negative angle W4 relative to the vertical line V.

The angles of inclination of the separating elements 2, 3 and 4 relative to the vertical line were respectively chosen at 26°, 36° and −10° in the example shown. These angles proved to be very effective in corresponding tests.

In the example shown, a separating element 5 with the same angle of inclination relative to the vertical line was additionally provided above the separating element 2 arranged thereunder.

On their lower edge, the separating elements 2, 3, 4, 5 feature a lower channel 21, 31, 41, 51 that opens toward the outlet side 12. On their upper edge, the separating elements 2, 3, 4, 5 accordingly feature an upper channel 22, 32, 42, 52 that opens toward the intake side 11.

Other positive effects are created by the edge profiles or channels that are located on the ends of the separating elements and also overlap in the horizontal and the vertical direction. Sharp air flow break-away edges can be prevented because the air can "adapt" to the edge profile on the lower end of the metal sheets. This improves the deflection.

On the upper end of the separating elements, the edge profile subjects the air flow to another deflection that in turn makes it possible to separate more particles.

Figure 3:
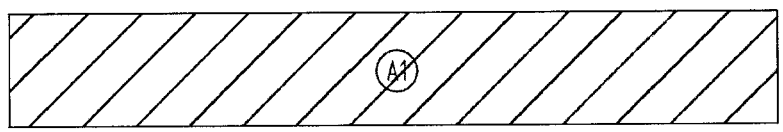
FIG. 3 shows a schematic illustration of the opening widths of the lower ends of the separating elements relative to a common vertical line.
Figure 3:
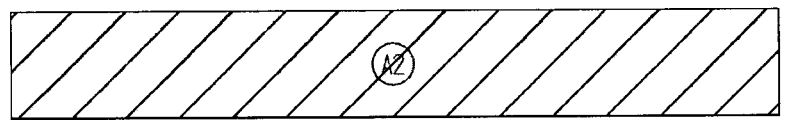
Figure 3:
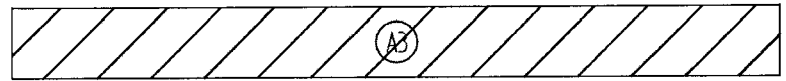
Figure 3:
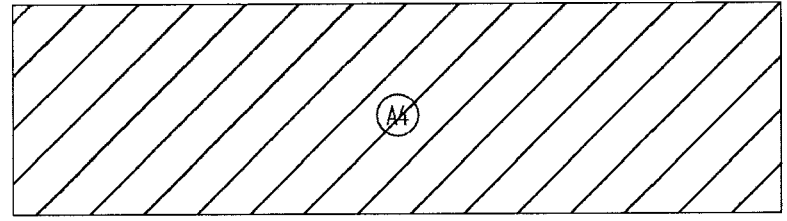

FIG. 3 shows a view corresponding to FIG. 1, which elucidates that the opening width A1-A3 of the lower edge of the separating elements 5, 2, 3, 4 relative to a common vertical line V decreases from separating element to separating element 5, 2, 3 in the downward direction and once again widens (A4) on the bottom separating element 4.

An air classification effect of sorts is achieved due to the combination of cross-sectional narrowing and cross-sectional widening. This effect is most pronounced on the bottom metal sheet. The position of the bottom metal sheet also largely prevents already separated material from being returned into the air volume flow again.

Figure 4:
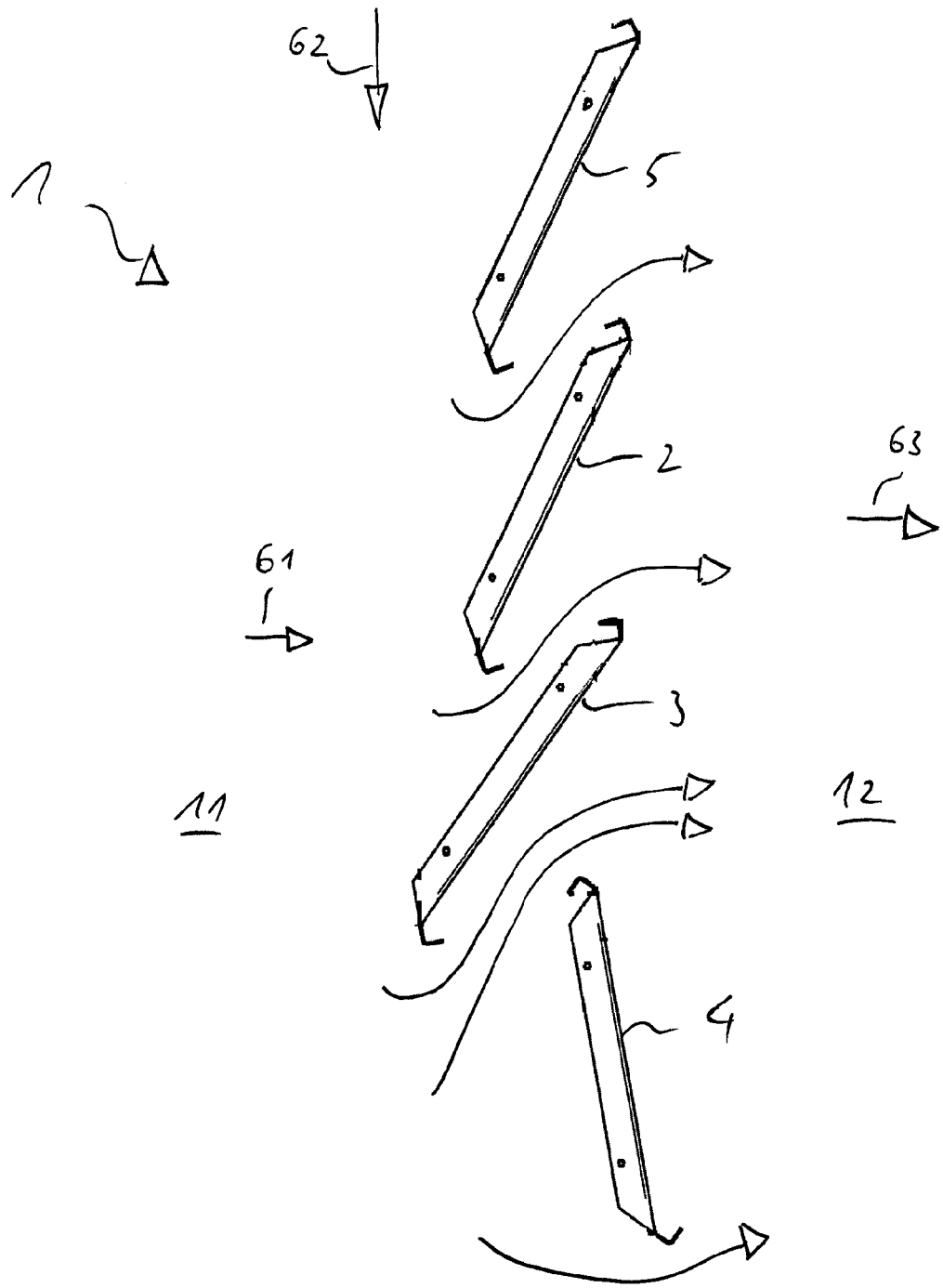
FIG. 4 shows a schematic illustration of the air flow through the material pre-separator from the intake side to the outlet side.

FIG. 4 once again shows the air flow path from the intake on the intake side 11, namely from the front 61 and primarily from above 62, and the discharge 63 on the outlet side 12. A sound separation of particles entrained by the arriving air flow 61, 62 is achieved upstream of and on the material pre-separator 1 due to the deflection on the separating elements 5, 2, 3, 4 and the change in direction from vertically downward to horizontal toward the discharge.

LIST OF REFERENCE SYMBOLS

1 Material pre-separator
11 Intake side
12 Outlet side
2 Separating element
21 Lower channel
22 Upper channel
3 Separating element
31 Lower channel
32 Upper channel
4 Separating element
41 Lower channel
42 Upper channel
5 Separating element
51 Lower channel
52 Upper channel
61 Inflow from front
62 Inflow from above
63 Discharge
A1-A4 Opening width
Wi Angle of separating element relative to vertical line
V Vertical line

The invention claimed is:

1. A material pre-separator with an intake side and an outlet side for a particle-contaminated air flow, the material pre-separator comprising several strip-shaped separating elements formed by metal sheets, the strip-shaped separating elements being arranged vertically on top of one another,
    wherein the several strip-shaped separating elements include plural strip-shaped separating elements that are arranged, going from top to bottom, with an increasing positive angle relative to a common vertical line and at least one lower strip-shaped separating element with a negative angle relative to the common vertical line,
    wherein the intake side is at a front or a top of the material pre-separator,
    wherein the plural strip-shaped separating elements and the lower strip-shaped separating element are arranged behind and underneath one another with an overlap when viewed from the intake side, and
    wherein the plural strip-shaped separating elements and the lower strip-shaped separating element have lower edges that define with the common vertical line respective opening widths that decrease from strip-shaped separating element to strip-shaped separating element in a downward direction and then widen at the lower strip-shaped separating element.

2. The material pre-separator according to claim 1, wherein at least one of the several strip-shaped separating elements has at the lower edge a lower channel that opens toward the outlet side.

3. The material pre-separator according to claim 1, wherein at least one of the strip-shaped separating elements has at an upper edge an upper channel that opens toward the intake side.

4. The material pre-separator according to claim 1, wherein the plural strip-shaped separating elements include two strip-shaped separating element having the angles of inclination relative to the vertical line respectively being between 21° and 31° and between 31° and 41°, and the angle of inclination of the lower strip-shaped separating element is chosen between −7° and −13°.

5. The material pre-separator according to claim 1, wherein several strip-shaped separating elements further include an upper strip-shaped separating element arranged atop the plural strip-shaped separating elements and having the same angle of inclination relative to the vertical line as an uppermost one of the plural strip-shaped separating elements.

* * * * *